United States Patent

Taguchi et al.

[11] 4,025,931
[45] May 24, 1977

[54] EXPOSURE DATA PRINTING DEVICE FOR A CAMERA

[75] Inventors: Tetsuya Taguchi; Mutsunobu Yazaki; Noriaki Sanada, all of Kanagawa, Japan

[73] Assignee: Canon Kabushiki Kaisha, Tokyo, Japan

[22] Filed: Mar. 20, 1975

[21] Appl. No.: 560,318

[30] Foreign Application Priority Data

Mar. 27, 1974 Japan .............................. 49-34206
Aug. 26, 1974 Japan .............................. 49-97741

[52] U.S. Cl. .............................. 354/105; 354/106; 355/40
[51] Int. Cl.² .............................. G03B 17/24
[58] Field of Search .......... 354/105, 106, 107, 108, 354/109; 355/40, 39

[56] References Cited

UNITED STATES PATENTS

| | | | |
|---|---|---|---|
| 2,821,124 | 1/1958 | Enright | 355/40 |
| 2,907,985 | 10/1959 | Doersam et al. | 354/105 X |
| 2,987,976 | 6/1961 | Martin | 354/109 |
| 3,554,102 | 1/1971 | Maronde | 354/106 |
| 3,739,697 | 6/1973 | Miyagawa | 354/108 |
| 3,812,508 | 5/1974 | Matsuda et al. | 354/106 |
| 3,889,281 | 6/1975 | Taguchi et al. | 354/105 X |

*Primary Examiner*—L. T. Hix
*Assistant Examiner*—J. A. LaBarre
*Attorney, Agent, or Firm*—Toren, McGeady and Stanger

[57] ABSTRACT

A device for printing an image of an indicium manually selected from a series of indicia representing different exposure values in or near the corresponding exposed frame of the film associated with a camera. Responsive to an actuation of the camera shutter release member, a pulse-forming circuit produces a pulse signal in a predetermined potential form which drives a switching circuit until the time dependant potential of the pulse signal reaches a threshold level for actuating an electronic switch controlling the period of actuation of a lamp by which said selected indicium is illuminated, whereby the time of exposure of the film to the indicium printing light is maintained constant irrespective of variation of the period of actuation of the camera shutter release member.

22 Claims, 7 Drawing Figures

EXPOSURE DATA PRINTING DEVICE FOR A CAMERA

FIELD OF THE INVENTION

This invention relates to photographic cameras, and, more particularly, to an exposure data printing device incorporated in the housing of a camera.

DESCRIPTION OF THE PRIOR ART

Exposure data printing devices are known in which the time interval of energization of a lamp illuminating a selected indicium presenting an employed exposure valve is controlled by use of a condenser connected in parallel with an electric power source through a mechanical switch cooperating with a camera shutter release member in such a manner that when the mechanical switch is closed in automatic response to an actuation of the shutter release member, the condenser is charged from the power source to a voltage higher than a predetermined threshold voltage level at which a switching circuit having an input connected to one pole of the condenser actuates an electronic switch controlling the period of energization of the lamp duration. After of a certain time interval, the mechanical switch is opened to discharge the condenser through a resistor connected across the condenser to a voltage lower than the threshold voltage level, thereupon the lamp is deenergized. With this switching arrangement, it has been the practice of the prior art as, for example, in the control of the time interval of the energization of the lamp to arrange the mechanical switch for operative association with the camera shutter release member so that the mechanical switch is closed at a point in the first step of the returning movement of the once depressed shutter release member, and is then opened at a point in the second step thereof. The prior art technique for controlling the period of energization of the lamp suffers from the irregularities of the period of actuation of the mechanical switch between the two time points due to some play of the chatter ring and the like, resulting in undesirable variation in the density of the indicium image on the developed film from frame to frame.

Another disadvantage of the prior art device is that the optical system for forming an image of an indicium to be printed with illumination of the lamp in or near the film frame necessitates a mounting structure arranged externally of the camera housing. The provision of such a mounting structure requires not only many supplementary structuring members with light-sealing means and a relatively large space therefor, but also individual focussing adjustments of images of indicia with high precision.

SUMMARY OF THE INVENTION

The present invention has for the general object to provide an automatic data printing device for use in a photographic camera in which images of indicia representing photographic data or exposure values employed and the like are automatically successively printed in or near the corresponding exposed film frames of the associated film in the camera, and, upon development of the film, provide a constant image density from frame to frame.

An object of the invention is to provide an automatic data printing device for use in a photographic camera in which the time interval of energization of the printing light source is controlled with high accuracy in printing images of indicia representing photographic data on the associated film in the camera so that the image density on the developed film is made constant from frame to frame.

Still another object of the invention is to provide an automatic data printing device adapted for use in a photographic camera having a shutter release member and provided with a pulse-forming circuit for producing a pulse signal with a predetermined magnitude and with a switching circuit receptive of the pulse signal and responsive to fulfilment of a threshold voltage level for actuating an electronic switch controlling the period of energization of the printing light source.

A further object of the invention is to provide an automatic data printing device for use in a camera in which the printing light source is energized only when the exposure of the film to the printing light is made to thereby save the consumption of electric energy which would be otherwise necessary when the printing operation is not made.

DESCRIPTION OF THE PREFERRED EMBODIMENT

Figure 1:
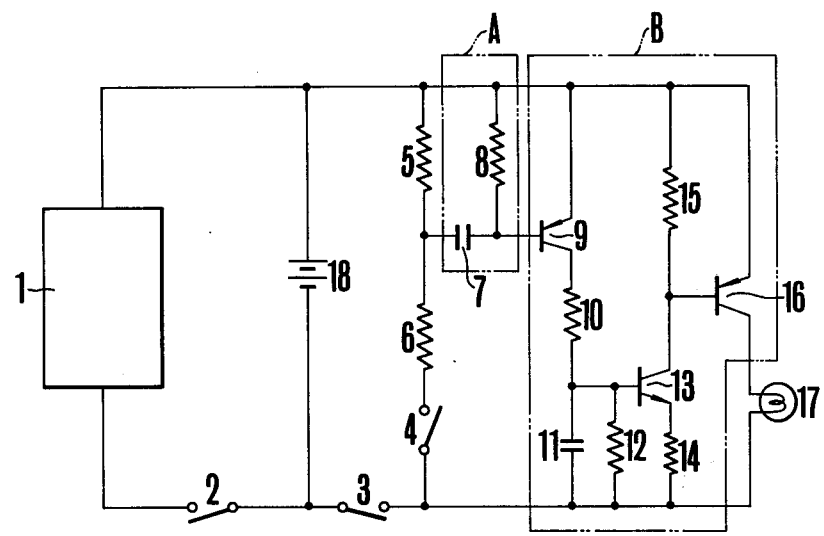
FIG. 1 is a circuit diagram of an automatic data printing device according to one embodiment of the present invention as applied to a camera having a mechanical shutter release member with which said device is operatively associated.

Referring now to FIG. 1, there is shown one embodiment of the electrical circuit of a automatic data printing device according to the invention as comprising a common electric power source or battery 18 of an electronic shutter control circuit 1 of the camera with a main switch 2 connected between circuit 1 and battery 18, a voltage divider comprising resistors 5 and 6 connected in series across battery 18 through series-connected switches 3 and 4, switch 3 functioning as a power switch for the printing device, and switch 4 being operatively associated with the mechanical shutter release member in a manner which will be described later in greater detail, a differentiation circuit A, and a switching circuit B receptive of the output of circuit A and responsive to fulfilment of a threshold voltage level for actuating an electronic switch 16 controlling the period of energization of a lamp 17 connected between the output terminals of the circuit B. The differentiation circuit A comprises a condenser 7 connected on one pole thereof to the junction of the resistors 5 and 7 and charged through a resistor 8 from the voltage developed across resistor 5. The switching circuit B comprises a first electronic switch or, a normally cut-off transistor 9 having a base electrode receptive of the output of circuit A, an emitter electrode connected to the positive bus and a collector electrode connected through a resistor 10 to one pole of a charging condenser 11, the other pole of which is connected to the negative bus, a discharging resistor 12 connected across condenser 11, a second electronic switch comprising a transistor 13 with the base connected to the junction of collector resistor 10 and charging condenser 11, with the emitter electrode connected through a resistor 14 to the negative bus and with the collector connected through a load resistor 15 to a positive bus, and a transistor 16 with the base connected to the collector of transistor 13, with the emitter connected to the positive bus and the collector connected through the lamp 17 to the negative bus.

Figure 3:
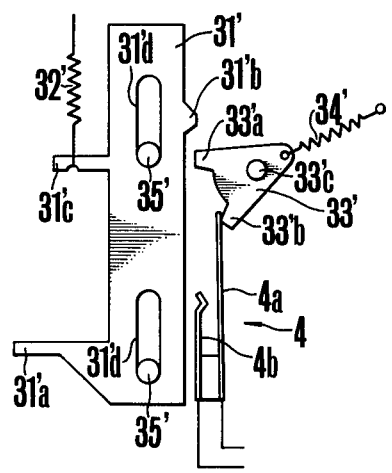
FIGS. 3, 4 and 5 are elevational views illustrating a mechanism for operative association of the embodiment of FIG. 1 in three different operative positions.
Figure 4:
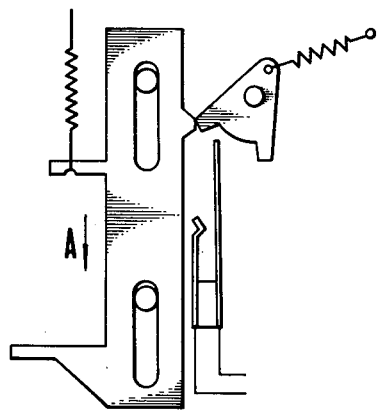
Figure 5:
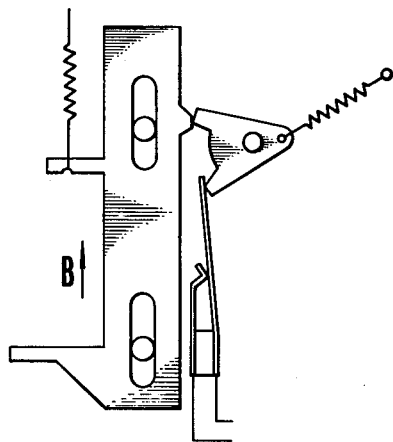

As shown in FIGS. 3, 4 and 5, the switch 4 of FIG. 1 is constructed with a movable contact 4a and a fixed contact 4b and is positioned to be controlled by an actuating member interacting between switch 4 and a mechanical shutter release member constructed in the form of a slide 31' having a push button not shown which is accessible from the outside of the camera housing. The slide 31' has a pair of longitudinally elongated slots 31'd in which respective guide pins 35' are engaged to guide the sliding movement thereof, an arm 31'a extending into a camera shutter actuating mechanism not shown, and a projection 31'c to which one end of a return spring 32' is connected to urge slide 31' for upward movement to a position shown in FIG. 3. The actuating member for switch 4 is constructed in the form of an angular lever 33' pivotal at a pin 33'c, and having a first projection 33'a extending into the path of movement of a projection 31b of slide 31', so that when the shutter release member is depressed to a position shown in FIG. 4, lever 33' is turned counter-clockwise against the force of a spring 34' connected between the apex of angular lever 33' and the camera housing, and having a second projection 33'b arranged in angular spaced relation to the first projection 33'a by a distance such that when lever 33' assumes an angular position shown in FIG. 5 as slide 31' returns from the depressed position to the initial position, the movable contact 4a is brought into instantaneous contact with the fixed contact 4b by engagement with the second projection 33'b.

The operation of the circuit of FIG. 1 with the switching arrangement of FIGS. 3, 4 and 5 is as follows.

In order to make an exposure, the camera operator depresses the shutter button (not shown) to move downwards the slide 31' against the force of return spring 32' in a direction A as being guided by pins 35'. Such downward movement of slide 31' causes the closure of the main switch 2 of the electronic shutter control circuit through a not shown intermediary operatively connected to slide 31' and a subsequent thereto an actuation of the electrically timed shutter not shown to initiate an exposure. On the other hand, the angular lever 33 is turned counter-clockwise against movement of slide 31 while the slide projection 31'b engaging with the first lever projection 33'a, and is then turned in the opposite direction under the action of spring 34' to the initial angular position shown in FIG. 3 during a second half of the downward movement thereof because of the disengagement of projection 33'a from projection 31'b, thereby the slide projection 31'b enters the space between the two lever projections 33'a and 33'b. In the course of these operations, the shutter mechanism is controlled by the electronic shutter control circuit 1 to terminate the exposure.

After the exposure has been completed, slide 31' is returned in a direction B under the action of spring 32', while opening the main switch 2 through the intermediary operatively connected with slide 31' and subsequent thereto closing the power switch 3 of the data printing device through another intermediary operatively connected with slide 31'. On the other hand, during a first part of the returning movement of slide 31', the angular lever 33 is turned clockwise in engagement at the first lever projection 33'a with slide projection 31'b causing the movable contact 4a of switch 4 to be brought into contact with the fixed contact 4b in engagement with the second projection 33'b as shown in FIG. 5. A further returning movement of slide 31' causes disengagement of the first lever projection 33'a from slide projection 31'b which in turn causes a counterclockwise movement of lever 33' under the action of spring 34' to the angular position shown in FIG. 3 to open switch 4 as the movable contact 4a is taken out of contact with the fixed contact 4b.

When switch 4 is closed, a voltage developed across resistor 4 is applied to the input of differentiation circuit A, causing a pulse signal with a potential wave form resulting from the differentiation of the input signal to appear at the output terminal of circuit A. The pulse signal drives the transistor 9 for conduction until the decreasing potential of the pulse signal downwardly reaches a predetermined threshold level. The time interval during which the transistor 9 is rendered conducting is made independent of the period of actuation of switch 4. While transistor 9 is conducting, the charging condenser is charged through collector resistor 10 to a voltage higher than a predetermined threshold voltage level. The attainment of the voltage across condenser 11 to the threshold voltage actuates the transistors 13 and 16 for conduction to energize the lamp 17. At the time when the potential of the pulse signal from circuit A is dropped from the threshold level, the transistor 9 is rendered non-conducting, and then the charge on the condenser 11 is permitted to leak away through resistor 12. At the time when the voltage across condenser 11 is dropped from the threshold level, the transistors 13 and 16 are rendered non-conducting to deenergize lamp 17.

It will be appreciated from the foregoing description that the circuit of the data printing device of the invention provides a printing light while still maintaining constant the time interval of energization of the printing light source irrespective of variation in the period of actuation of the switch cooperating with the mechanical shutter release member based on the establishment of a constant voltage of the charging condenser which actuates the electronic switch controlling the period of energization of the printing light source, thereby it being made possible to eliminate the irregularities of the density of the printed images on the developed film due to the presence of play of the chatter ring and the like.

Figure 7:
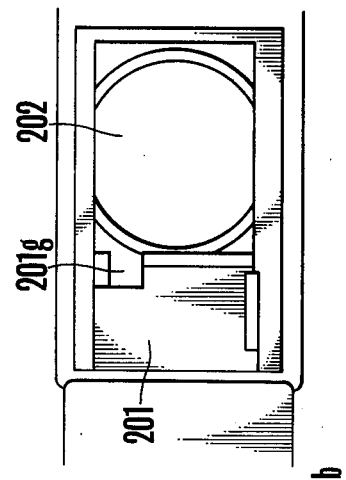
FIG. 7 is a fragmentary elevational view of a camera with the back cover thereof removed to illustrate a location of the image plane of the optical system of FIG. 6 relative to the film gate of the camera as viewed from the rear side of the camera.
Figure 6:
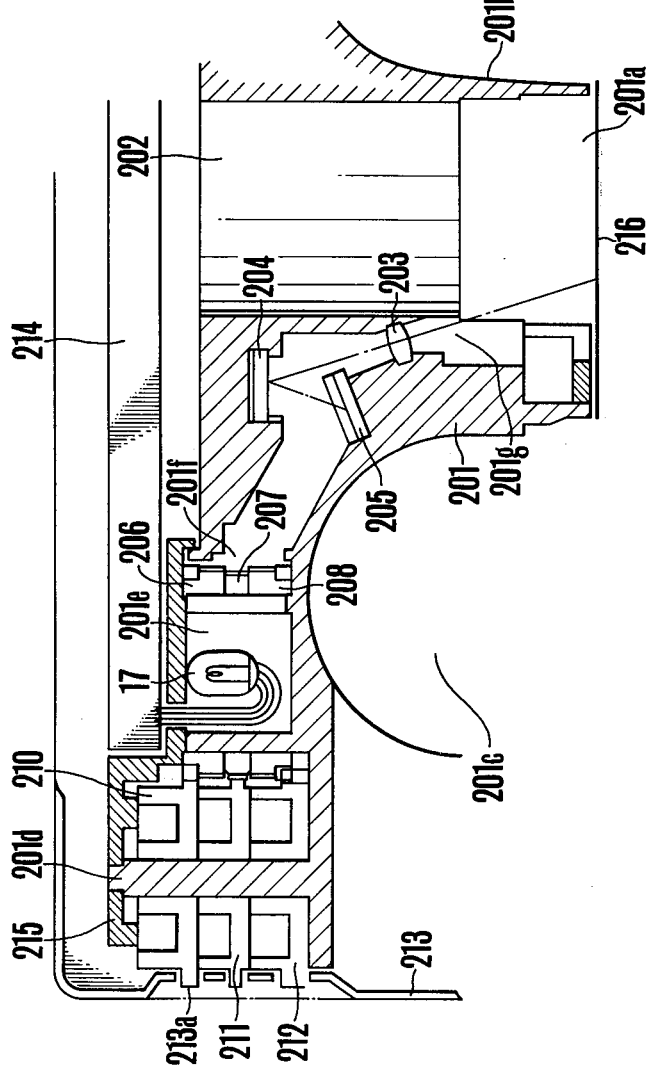
FIG. 6 is a schematic sectional view illustrating an example of arrangement of the printing light source, indicium carrier and image-forming optical system in an automatic data printing device of the invention incorporated in the housing of a camera.

FIGS. 6 and 7 show an example of arrangement of the lamp, an indicium carrier and an image-forming optical system of a data printing device of the invention as mounted within a space in that portion of the internal housing 201 of a camera between a main camera chamber 201b before a rectangular film aperture 201a and a film magazine chamber 201c and in front of chamber 201c. The internal housing 201 of the camera is made of plastic material by moulding, and an external housing 214 thereof supports on its front wall an objective lens system 202 in alignment with the film aperture 201a. The indicium carrier is comprised of three transparent rings 206, 207 and 208 of identical dimensions with each other and independently rotatable about a common axis, the rings 206, 207 and 208 carrying respective transparency strips rigidly secured around the circumferences thereof and each of which has a series of indicia printed thereon. In order to bring the selected indicium to a predetermined location by rotating each of the rings 206, 207 and 208, there are provided three setting rings 210, 211 and 212 rotatable about a shaft 201a and having gears toothed in the outer circumferences for engagement with respective gears of indicium carrier rings 206, 207 and 208. The setting rings 210, 211 and 212 also carry indicia corresponding to those of rings 206, 207 and 208, and arranged thereon to be visible through a window 213a provided through the external housing 213 of the camera so that a desired combination of indicia to be printed can be selected by the camera operator in such a manner that while looking through the window 213a, each of the setting rings is manually rotated until a desired indicium appears at window 213a, thereby the adjusted rings are held from further rotation by means of respective click stops, and the indicia corresponding to those appearing at window 213a are positioned to face a slit 201a. The lamp 17 of FIG. 1 is located within the space defined by indicium carrier rings 206, 207 and 208 upon energization thereof to illuminate the selected indicia on those portions of rings 206, 207 and 208 which face slit 201f. The printing light bearing the selected indicia is successively reflected from mirrors 205 and 204 to a lens 203 by which images of the indicia are focused through an opening 201a on the film 216 in the vicinity of a film frame behind the film aperture 201b. It is to be understood from FIG. 6 that when the data printing device of the invention is applied to a camera of small size, it is desirable to incorporate the lamp and the image forming optical system within the camera housing and to arrange the indicium carrier and its setting mechanism adjacent the lamp but in the outside of the camera housing.

Figure 2:
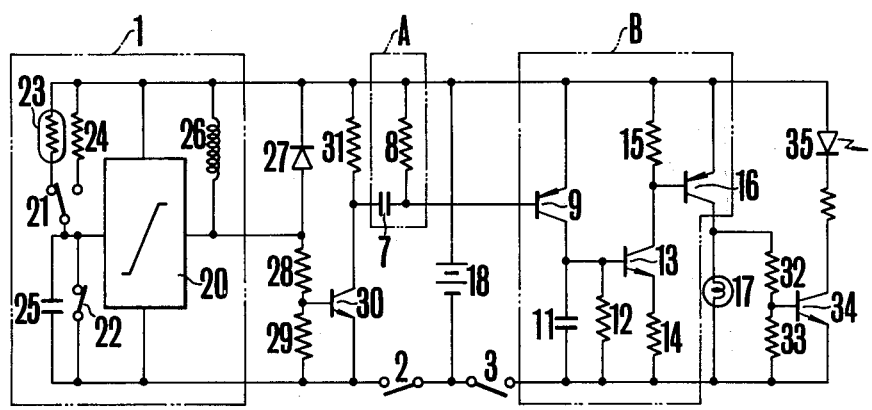
FIG. 2 is a circuit diagram of a automatic data printing device according to another embodiment of the invention as applied to a camera having an electrical shutter release member with which said device is operatively associated.

FIG. 2 shows another embodiment of the circuit of an automatic data printing device according to the invention as applied to a camera having an electrical shutter release member with which said device is operatively associated to control the energization of the lamp, wherein the same numerals are employed to denote parts of that embodiment of the invention whch remain unchanged from the embodiment illustrated in FIG. 1. The electronic shutter control circuit 1 comprises a switching circuit for actuating the solenoid 26 of an electromagnet, a transfer switch 21 for selecting either of a photosensitive element CdS 23 and a fixed resistor 24 for connection to a condenser 25 so that the camera is rendered operative in an automatic daylight exposure range and in a constant shutter speed flash light exposure range respectively, and a short-circuiting switch 22 connected across the condenser 25. In order to prevent misoperation of the printing device due to the voltage developed across the solenoid 26, there is provided a diode 27 connected across solenoid 26. An electronic switch for actuating the differential circuit A in automatic response to the termination of exposure controlled by said switching circuit 20 comprisesd resistors 28 and 29 connected in series with each other and to solenoid 26, a transistor 30 having a base connected to the junction of resistors 28 and 29 and a collector resistor 31 of transistor 30. The voltage developed across resistor 31 is applied to the condenser 7 of differentiation circuit A. In order to indicate whether the lamp 17 is energized or not, there is provided a display circuit comprising resistors 32 and 33 connected in series to each other and across lamp 17, a transistor 34 having a base electrode connected to the junction of resistors 32 and 33, and an indicator 35 such as LED element arranged in the field of view of the camera finder not shown.

The operation of circuit of FIG. 2 is as follows. When the solenoid 26 is deenergized to terminate an exposure, the potential at the junction of resistors 28 and 29 rises to drive transistor 30. Upon conduction of transistor 30, a current is allowed to flow through collector resistor 31, the voltage developed across resistor 31 being applied to the differentiation circuit A. As a result, the lamp 17 is energized in an accurately controlled time interval as has been described above. So long as lamp 17 is energized, the transistor 34 is rendered conducting to flow a current through the indicator 35.

The provision of switch 3 is not always necessary. When it is not used, the battery 18 may be directly connected to the switching circuit B without causing wasteful consumption of electrical energy from battery 18 because the transistors 9, 13, 16 and 34 are conducting only when the printing operation is carried out.

It will be seen from the foregoing description that the present invention provides a data printing device which operates with a printing light energy control circuit of simple construction in a manner to energize the printing light source only when the photographic material is exposed to the printing light in an accurately controlled time interval.

What is claimed is:
1. A data printing circuit adapted for use in a camera comprising:
 a. a power source;
 b. a pulse generation means to generate a pulse signal having a prescribed amplitude at a time of data printing;
 c. an electric charge accumulation means to accumulate electric charge;
 d. a charging amount control means connected to said electric charge accumulation means and said power source to control the amount of charging from said power source by the electric charge accumulation means based on said prescribed pulse amplitude responding to the pulse signal from said pulse generation means, whereby as a consequence of the amplitude of pulse being constant, the amount of charging by the electric charge accumulation means will be constant; and
 e. an exposure control means to control exposure for printing data onto a film plane based on the amount of charging by the electric charge accumulation means, whereby as a consequence of the amount of charging by the electric charge accumulation means being constant, the exposure will be constant, and data printing will be performed with a constant density.

2. A data printing circuit adapted for use in a camera according to claim 1 in which said electric charge accumulation means is a capacitor.

3. A data printing circuit adapted for use in a camera according to claim 1 in which said pulse generation means is a differential circuit.

4. A data printing circuit adapted for use in a camera comprising:
   a. a power source;
   b. a pulse generation means to generate a pulse signal having a prescribed amplitude at a time of data printing;
   c. an electric charge accumulation means to accumulate electric charge;
   d. a switching circuit connected between said power source and said electric charge accumulation means to form a feeding path between said power source and said electric charge accumulation means only during such period of time which corresponds to a prescribed pulse amplitude of the pulse signal supplied by said pulse generation means in response to said pulse signal, whereby the feeding path of the electric accumulation means is always maintained for a constant period of time and the amount of charging by said accumulation means also becomes constant; and
   e. an exposure control means to control exposure for printing data onto a film plane based on the amount of charging by the electric charge accumulation means, whereby as a consequence of the amount of charging by the electic charge accumulation means being constant, the exposure will be constant, and data printing will be performed with a constant density.

5. A data printing circuit adapted for use in a camera according to claim 4 in which said electric charge accumulation means is a capacitor.

6. A data printing circuit adapted for use in a camera according to claim 4, in which said pulse generation means is a differential circuit.

7. A data printing circuit adapted for use in a camera comprising:
   a. a data carrier having data to be printed into a film plane;
   b. a power source;
   c. a pulse generation means to generate a pulse signal having a prescribed amplitude at a time of data printing;
   d. an electric charge accumulation means to accumulate electric charge;
   e. a charging amount control means connected to the electric charge accumulation means and said power source to control the amount of charging from said power source by said electric charge accumulation means based on the amplitude of the pulse from the pulse generation means in response to said pulse signal, whereby as a consequence of said pulse amplitude being constant, the charging amount of the electric charge accumulation means becomes constant; and
   f. a light source with said data carrier for data printing having its light emission amount controlled based on the charging amount of said electric charge accumulation means, whereby as a consequence of the charging amount of the electric charge accumulation means being constant, the light emission amount by the data printing light source becomes constant and data will be printed into said film plane with a constant density.

8. A data printing circuit adapted for use in a camera according to claim 7, in which said pulse generation means is a differential circuit.

9. A data printing circuit adapted for use in a camera according to claim 7, in which a switching circuit connected between said electric charge accumulation means and light source is provided for producing an output corresponding to said charging amount of electric charge accumulation means and said light source is lighted by the output of said switching circuit.

10. A data printing circuit adapted for use in a camera according to claim 9, which further includes an indication means connected to said switching means and provided on a camera body for indicating whether said light source is energized or not.

11. A data printing circuit adapted for use in a camera according to claim 7, in which said light source is mounted in a space within an internal housing of a camera body, and a light conduct through which data-bearing light passes to an image forming optical means for forming an image of said data on the film and a mount for said image forming optical means are integrally made and built in said internal housing of the camera body so that said image of data is focused on the film.

12. A data printing circuit adapted for use in a camera comprising:
   a. a power source;
   b. a pulse generation means to generate a pulse signal having a prescribed amplitude;
   c. a switching means to impress a driving signal onto said pulse generation means;
   d. an electric charge accumulation means to accumulate electric charge;
   e. a charging amount control means connected to the electric charge accumulation means and said power source to control the amount of charging from said power source by the electric charge accumulation means based on said pulse amplitude from the pulse generation means in response to said pulse signal, whereby as a consequence of said pulse amplitude being constant, the amount of charging by the electric charge accumulation means will be constant; and
   f. an exposure control means to control exposure for data printing onto film plane based on the amount of charging by said electric charge accumulation means, whereby as a consequence of the amount of charging by the electric charge accumulation means being constant, the exposure will be constant and data printing will be performed with a constant density.

13. A data printing circuit adapted for use in a camera according to claim 12, in which said pulse generation means is a differential circuit.

14. A data printing circuit adapted for use in a camera according to claim 12, in which said switching means is a switch having its opening and closing controlled in association with a shutter release mechanism.

15. A data printing circuit adapted for use in a camera comprising:
   a. a data carrier having data to be printed onto film plane;
   b. a power source;
   c. a pulse generation means to generate a pulse signal having a prescribed amplitude;

d. a switching means to impress driving signal onto said pulse generation means;

e. an electric charge accumulation means to accumulate electric charge;

f. a charging amount control means connected to the electric charge accumulation means and said power source to control the amount of charging from said power source by said electric charge accumulation means based on the prescribed pulse amplitude from said pulse generation means in response to said pulse signal, whereby as a consequence of said pulse amplitude being constant, the amount of charging by the electric charge accumulation means is constant; and g. a light source with said data carrier for data printing having its light emission amount controlled based on the amount of charging by said electric charge accumulation means, whereby as a consequence of the amount of charging by the electric charge accumulation means being constant, the light emission amount of the data printing light source becomes constant and data will be printed in the film plane with a constant density.

16. A data printing circuit adapted for use in a camera according to claim 15, in which said pulse generation means is a differential circuit.

17. A camera having a data printing circuit which comprises:

a. a data carrier having data to be printed onto a film plane;

b. a power source;

c. a differential circuit;

d. a switching means to impress the voltage of said power source onto the differential circuit at a time of data printing, wherein said differential circuit generates differential pulse having a prescribed pulse amplitude by impressing of the power source voltage thereonto;

e. an electric charge accumulation means to accumulate electric charge;

f. a switching circuit connected between said power source and said electric charge accumulation means to form a feeding path for said power source to the electric charge accumulation means in response to said differential pulse for such period of time which corresponds to the amplitude of said differential pulse, whereby the electric charge accumulated in said electric charge accumulation means becomes constant; and g. a power source for data printing having its light emission amount controlled based on the amount of charging accumulated at said electric charge accumulation means, whereby said data carrier is irradiated with a constant light emission amount by the data printing light source to print data with a constant density.

18. A camera having a data printing circuit which comprises:

a. a shutter time control circuit having:
 1. a power source,
 2. a time constant circuit connected to said power source,
 3. a first switching circuit to conduct switching in response to the output of said time constant circuit, and
 4. an electromagnetic means to control a shutter closing member by switching of said first switching circuit; and b. a data printing circuit having:
 1. a pulse generation means actuated based on the switching of said first switching circuit and generating pulse having a prescribed amplitude,
 2. an electric charge accumulation means to accumulate electric charge,
 3. a charging amount control means connected to said electric charge accumulation means and said power source to control the amount of charging from said power source by the electric charge accumulation means based on said amplitude of pulse responding to the pulse signal from said pulse generation means, whereby since the amplitude of pulse is constant the amount of charging by the electric charge accumulation means will be constant, and
 4. an exposure control means to control exposure for printing data onto film plane based on the amount of charging by the electric charge accumulation means, whereby since the amount of charging by the electric charge accumulation means is constant the exposure will be constant, thus data printing is done with a constant density.

19. A camera having a data printing circuit according to claim 18, in which the electromagnetic means of said shutter time control circuit has a one-way conductive element connected in parallel.

20. A camera having a data printing circuit which comprises:

a. a shutter time control circuit including:
 1. a power source,
 2. a time constant circuit connected to said power source,
 3. a first switching circuit to conduct switching in response to the output of said time constant circuit, and
 4. an electromagnetic means to control a shutter closing member by switching of said first switching circuit; and b. a data printing circuit, including:
 1. a data carrier having data to be printed onto film plane,
 2. a pulse generation means actuated based on the switching of said first switching circuit and generating a pulse having a prescribed amplitude,
 3. an electric charge accumulation means to accumulate electric charge,
 4. a charging amount control means connected to said electric charge accumulation means and said power source to control the amount of charging from said power source by the electric charge accumulation means based on sain amplitude of pulse responding to the pulse signal from said pulse generation means, whereby as a consequence of the amplitude of pulse being constant, the amount of charging by the electric charge accumulation means will be constant, and
 5. a light source with said data carrier for data printing having its light emission amount controlled based on the charging amount of said electric charge accumulation means, whereby as a consequence of the charging amount of the electric charge accumulation means being constant, the light emission amount by the light source will be constant and data will be printed onto film plane with a constant density.

21. A camera having a data printing circuit according to claim 19 in which said light source is lighted for such period of time corresponding to the amount of charging by the electric charge accumulation means.

22. A camera having a data printing circuit which comprises:
   a. a shutter time control circuit including:
      1. a power source,
      2. a time constant circuit,
      3. a first switching circuit to conduct switching in response to the output of said time constant circuit, and,
      4. an electromagnetic means to control a shutter closing member by switching of said first switching circuit; and
   b. a data printing circuit which includes:
      1. a differential circuit,
      2. a second switching circuit connected to said first switching circuit and said second switching circuit is operated in response to the switching of said first switching circuit to impress the voltage of said power source onto the differential circuit, whereby said differential circuit produces an output pulse when said second switching circuit is operated,
      3. a capacitor,
      4. a third switching circuit which is connected between the power source and the capacitor and becomes ON in response to said output pulse from said differential circuit for such period of time that the output pulse is generated from said differential circuit, whereby said capacitor is charged only during such period of time that said pulse is generated to secure a prescribed charging amount, and
      5. a data printing light source lighted during such period of time as based on the amount of charging at said capacitor.

* * * * *